US008504361B2

(12) United States Patent
Collobert et al.

(10) Patent No.: US 8,504,361 B2
(45) Date of Patent: Aug. 6, 2013

(54) DEEP NEURAL NETWORKS AND METHODS FOR USING SAME

(75) Inventors: Ronan Collobert, Princeton, NJ (US); Jason Weston, New York, NY (US)

(73) Assignee: NEC Laboratories America, Inc., Princeton, NJ (US)

( * ) Notice: Subject to any disclaimer, the term of this patent is extended or adjusted under 35 U.S.C. 154(b) by 1183 days.

(21) Appl. No.: 12/367,788

(22) Filed: Feb. 9, 2009

(65) Prior Publication Data

US 2009/0210218 A1 Aug. 20, 2009

Related U.S. Application Data

(60) Provisional application No. 61/026,883, filed on Feb. 7, 2008.

(51) Int. Cl.
*G10L 15/16* (2006.01)
(52) U.S. Cl.
USPC .............................. 704/232; 704/9
(58) Field of Classification Search
USPC ................................. 704/232, 9, 23
See application file for complete search history.

(56) References Cited

U.S. PATENT DOCUMENTS

| | | | | |
|---|---|---|---|---|
| 5,325,298 A * | 6/1994 | Gallant | ............................. | 704/9 |
| 5,619,709 A * | 4/1997 | Caid et al. | ...................... | 715/209 |
| 5,873,056 A * | 2/1999 | Liddy et al. | ......................... | 704/9 |
| 5,930,746 A * | 7/1999 | Ting | .................................. | 704/9 |
| 6,128,606 A * | 10/2000 | Bengio et al. | .................... | 706/10 |
| 6,246,977 B1 * | 6/2001 | Messerly et al. | ................... | 704/9 |
| 6,981,218 B1 * | 12/2005 | Nagao | ........................... | 715/234 |
| 7,076,732 B2 * | 7/2006 | Nagao | ........................... | 715/233 |
| 7,742,911 B2 * | 6/2010 | Chotimongkol et al. | ......... | 704/4 |
| 7,822,598 B2 * | 10/2010 | Carus et al. | ........................ | 704/9 |
| 7,844,457 B2 * | 11/2010 | Chen et al. | ..................... | 704/244 |
| 2003/0177108 A1 * | 9/2003 | Charlesworth et al. | ............ | 707/1 |
| 2004/0172238 A1 * | 9/2004 | Choo et al. | ..................... | 704/202 |
| 2005/0044487 A1 * | 2/2005 | Bellegarda et al. | ............ | 715/511 |
| 2009/0089058 A1 * | 4/2009 | Bellegarda | ..................... | 704/251 |

OTHER PUBLICATIONS

Nakamura et al "Neural Network Approach to Word Category Prediction for English Texts", Published in: • Proceeding Nakamura et al. Neural Network Approach to Word Category Prediction for English Texts, Proceedings of the 13th conference on Computational linguistics, 1990—vol. 3, pp. 213-218.*

* cited by examiner

*Primary Examiner* — Pierre-Louis Desir
*Assistant Examiner* — Abdelali Serrou
(74) *Attorney, Agent, or Firm* — Joseph Kolodka

(57) ABSTRACT

A method and system for labeling a selected word of a sentence using a deep neural network includes, in one exemplary embodiment, determining an index term corresponding to each feature of the word, transforming the index term or terms of the word into a vector, and predicting a label for the word using the vector. The method and system, in another exemplary embodiment, includes determining, for each word in the sentence, an index term corresponding to each feature of the word, transforming the index term or terms of each word in the sentence into a vector, applying a convolution operation to the vector of the selected word and at least one of the vectors of the other words in the sentence, to transform the vectors into a matrix of vectors, each of the vectors in the matrix including a plurality of row values, constructing a single vector from the vectors in the matrix, and predicting a label for the selected word using the single vector.

8 Claims, 4 Drawing Sheets

DEEP NEURAL NETWORKS AND METHODS FOR USING SAME

RELATED APPLICATION

This application claims the benefit of U.S. Provisional Application No. 61/026,883, filed Feb. 07, 2008, the entire disclosure of which is incorporated herein by reference.

FIELD OF THE INVENTION

This invention relates to natural language processing. More particularly, this invention relates to a deep neural network adapted for use in natural language processing.

BACKGROUND OF THE INVENTION

Natural Language Processing (NLP) aims to convert human language into a formal representation that is easy for computers to manipulate. Current end applications include information extraction, machine translation, summarization, search and human-computer interfaces.

While complete semantic understanding is still a far-distant goal, researchers have taken a divide and conquer approach and identified several sub-tasks useful for application development and analysis. These range from the syntactic, such as part-of-speech labeling, chunking and parsing, to the semantic, such as word-sense disambiguation, semantic-role labeling, named entity extraction and anaphora resolution.

Currently, those tasks are typically analyzed separately. Many methods/systems possess few characteristics that would help develop a unified architecture which would presumably be necessary for deeper semantic tasks. In particular, many systems possess three failings in this regard: (i) they incorporate many hand-engineered features specific for one task; (ii) they cascade features learnt separately from other tasks thus propagating errors; and (iii) the systems are shallow in the sense that the classifier is often linear.

Accordingly, a method is needed which avoids the failings of prior methods.

SUMMARY

A method is disclosed herein for labeling a selected word of a sentence using a deep neural network. The method, in one exemplary embodiment, comprises determining in a first computer process, an index term corresponding to each feature of the word, transforming the index term or terms of the word into a vector in a second computer process, and predicting a label for the word in a final computer process using the vector.

The method, in another exemplary embodiment comprises determining in a first computer process, for each word in the sentence, an index term corresponding to each feature of the word, transforming the index term or terms of each word in the sentence into a vector in a second computer process, applying a convolution operation in a third computer process to all the vectors to transform the vectors into a matrix of vectors, each of the vectors in the matrix including a plurality of row values, constructing a single vector from the vectors in the matrix in a fourth computer process, and predicting a label for the selected word in a fifth computer process using the single vector.

Also disclosed herein is a system comprising a central processing unit and a memory communicating with the central processing unit. The memory comprises instructions executable by the processor for labeling a selected word of a sentence using a deep neural network. The instructions, in one exemplary embodiment include determining an index term corresponding to each feature of the word, transforming the index term or terms of the word into a vector, and predicting a label for the word using the vector.

The instructions, in another exemplary embodiment, include determining, for each word in the sentence, an index term corresponding to each feature of the word, transforming the index term or terms of each word in the sentence into a vector, applying a convolution operation to all the vectors to transform the vectors into a matrix of vectors, each of the vectors in the matrix including a plurality of row values, constructing a single vector from the vectors in the matrix, and predicting a label for the selected word using the single vector.

DETAILED DESCRIPTION

Disclosed herein is a unified network architecture for NLP that learns features that are relevant to the tasks at hand given very limited prior knowledge. This is achieved in the present method by training a single, unified deep convolutional neural network (NN) in a end-to-end fashion: words are given at an input of the NN which outputs in return the corresponding class labeling. Deep NNs have more than one layer of parameters which are trained, as compare with Shallow NNs which only have one layer of parameter which are trained. Features relevant to the task are learned automatically by backpropagation in deep layers of the NN. The method disclosed herein may be applied to many well known NLP tasks including, but not limited to, part-of-speech tagging (POS), chunking, named-entity recognition, learning semantic similarity between words, learning a language model and the task of semantic role-labeling. All of these tasks are integrated into the deep NN, which are trained jointly. All the tasks except the language model may be supervised tasks with labeled training data. The language model is trained in an unsupervised fashion on, any suitable database of text documents. For example but not limitation, the language model may be trained in one exemplary embodiment on the entire Wikipedia website. Training this task jointly with the other tasks comprises a novel form of semi-supervised learning.

Figure 1:
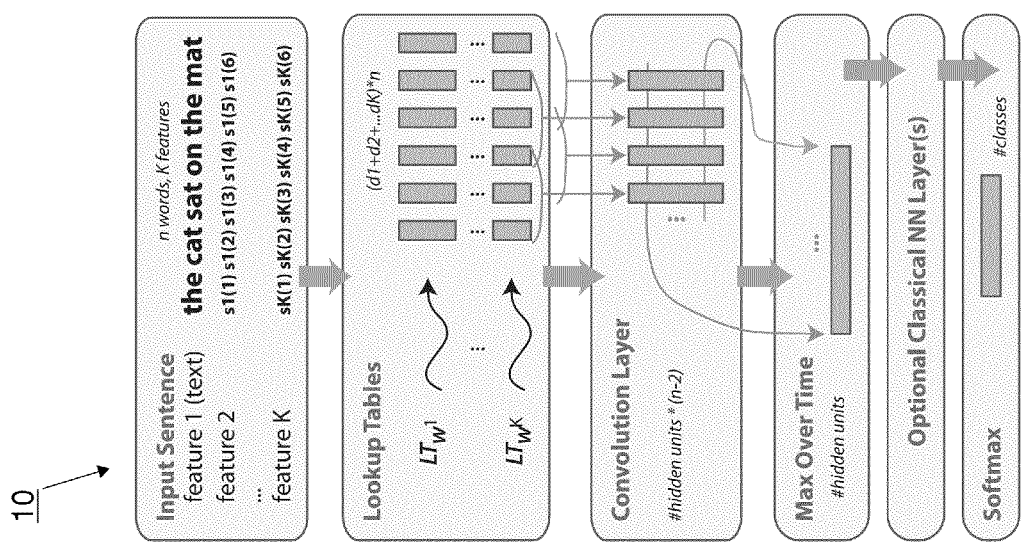
FIG. 1 is a block diagram of one exemplary embodiment of a deep convolutional multi-layered neural network (NN) according to the present disclosure.

FIG. 1 shows a block diagram of one exemplary embodiment of a deep convolutional multi-layered NN 10 according to the present disclosure. The NN 10 generally comprises a layer 11 that automatically extracts features for each word present in a selected dictionary (e.g. look-up table) and extracts features relevant to a given task using words in the same neighborhood, a convolution layer 13, one or more conventional NN layers 14 (one or more matrix-vector operations each followed by a non-linearity function), and an optional softmax layer 15, which interprets each output of the NN 10 as a probability of the corresponding label (if the softmax layer is not used, the output of the NN 10 will be a score, not a probability).

Since the present NN 10 deals with raw words and not pre-computed hand-made features, the layer 11 automatically convert words into real vectors understandable by the subsequent layers of the NN 10. In one exemplary embodiment, words may be considered as indices in a finite dictionary of words $D \subset N$.

A word index $i \in D$ may be transformed into a vector by using a lookup table $LT_W(\cdot)$:

$$LT_W(i) = W_i,$$

where $W \in R^{d \times |D|}$ is a matrix of parameters to be trained, $W_j \in R^d$ is the $i^{th}$ column of W and d is the word vector size (wsz) to be chosen by the user.

In the first layer 10 of the NN 10, an input sentence $\{s_1, s_2, \ldots s_n\}$ of n words in D is thus transformed into a series of vectors $\{W_{s1}, W_{s2}, \ldots W_{sn}\}$ by applying the lookup-table to each of its words. The parameters W of the first layer 10 are automatically trained during the learning process using back-propagation.

In practice, it is often desirable to reduce the number of words in the dictionary D to improve generalization performance. One exemplary method to reduce the number of words in the dictionary is to use stemming wherein a word becomes a pair composed of two elements, e.g., a word root and an end stem.

In any case, if a word is decomposed in K elements, it can be represented as a tuple $i = \{i^1, i^2, \ldots i^K\} \in D^1 \times \ldots \times D^K$, where $D^k$ is the dictionary corresponding to the k-element. Each element is associated to a lookup-table $LT_{W^k}(\cdot)$, with parameters $W^k \in R^{d^k \times |D^k|}$ and $d_k \in N$ a vector size to be selected. The vector column representing a word i is then a vector of size $d = \Sigma_k d^k$ given by the concatenation of all lookup-table outputs:

$$LT_{W^1, \ldots, W^K}(i)^T = (LT_{W^1}(i^1)^T, \ldots, LT_{W^K}(i^K)^T)$$

As with only one lookup-table, the layer 11 of the NN 10 applies this transformation to each word of a given sentence, and outputs a series of vectors for this sentence.

In a complex NLP task like SRL (semantic role labeling), the class label of each word in a sentence depends on a predicate chosen beforehand in this sentence. It is, therefore, necessary to find a way to specify in the NN 10 which predicate is to be selected in the sentence. Therefore, for each word in the sentence, layer 11 information pertaining to the relative distance between this word and the chosen predicate is added. Given a predicate at position $pos_p$ in the sentence, the distance between the $i^{th}$ word in the sentence and this predicate is encoded by using an additional lookup table $LT^{dist_p}(i - pos_p)$. The output of this lookup table is concatenated with the other lookup tables representing words, as described previously when using multiple lookup-tables.

In one exemplary embodiment, the output of layer 11 may be processed by considering a sequence $x(\cdot)$ of n identically sized vectors which are the concatenation of the outputs of the lookup-tables of layer 11:

$$(x_1, x_2, \ldots, x_n), \forall t \, x_t \in R^d \quad (1)$$

The size n of the sequence varies because the number of words in a sentence is typically not constant. Unfortunately, conventional NN like Multi-Layer Perceptrons (MLPs) are not able to handle sequences of variable length. This issue may be overcome, in one exemplary embodiment, by considering only a window of fixed size ksz (with ksz to be chosen) around each word to be labeled. A classical MLP layer may be used, which operates a matrix-vector multiplication over the concatenation of the word features vectors present in the input window. To label a complete sentence, the input window is slidably moved along the sentence, labeling one word at the time. This method works with great success on simple tasks, such as POS, however, it fails on more complex tasks such as SRL, because the label of a given word often depends on words far away in the sentence, and possibly out of the considered window.

When far dependencies occur in the sequence, a preferred method for processing the output of layer 11 is to use a Time-Delay Neural Network (TDNN) layer 13. A TDNN is a type of NN which is capable of working on sequences having a semblance order, so that the reading of the sequence is a real-time process, e.g., at time t, one sees $x_t$ the $i^{th}$ word in the sentence. Given a sequence $x(\cdot)$, the TDNN layer 13 outputs another sequence $o(\cdot)$ whose value at time t can be computed as:

$$o(t) = \sum_{j=1-t}^{n-t} L_j \cdot x_{t+j}, \quad (2)$$

where $L_j \in R^{n_{hu} \times d}(-n \leq j \leq n)$ are the parameters of the layer (with $n_{hu}$ hidden units) trained by back-propagation. Note that the parameters $L_j$ are shared through time t: thus the TDNN layer 13 operates a convolution on the input sequence. In one exemplary embodiment, this convolution is constrained by defining a kernel width ksz which enforces $$\forall |j| \rangle \frac{ksz - 1}{2}, L_j = 0. \quad (3)$$

A window approach considers only words present in a window of size ksz around the word to be labeled. The preferred layer 13 performs equations (2) and (3), i.e., TDNN layer 13 considers at the same time all windows of ksz words in the sentence. Using only one TDNN layer 13 is, therefore, substantially equivalent to a window approach, except that the labeling is done for all words at the same time by the network 10, instead of sliding a window over the sentence.

In an alternate embodiment, a stack of TDNN layers 13, i.e., adding an additional input feature which is the distance of the word of interest with respect to each word in the sentence, may be used to provide further improvements over the sliding window method. By indicating the word to be labeled (word of interest) and taking the maximum over time (equation (2)), the NN 10 is capable of using features extracted from all windows of ksz words in the sentence to compute the label of the word of interest.

Indicating the word to be labeled to the NN 10 may be easily performed using an additional lookup-table, as discussed above regarding the labeling of the sentence with respect to a predicate. Specifically, considering the word at position $pos_w$, the relative distance between the $i^{th}$ word in the sentence and this word is encoded using a lookup-table $LT^{dist_W}(i - pos_W)$.

In multi-task learning (MTL), several tasks are learned at the same time in the hope of improving each task. In the case of related tasks, features useful for one task may be useful for other tasks. For example, in NLP, POS is often used as a feature for SRL but also for NER (name entity recognition). Improving POS generalization performance might thus improve both SRL and NER.

Figure 2:
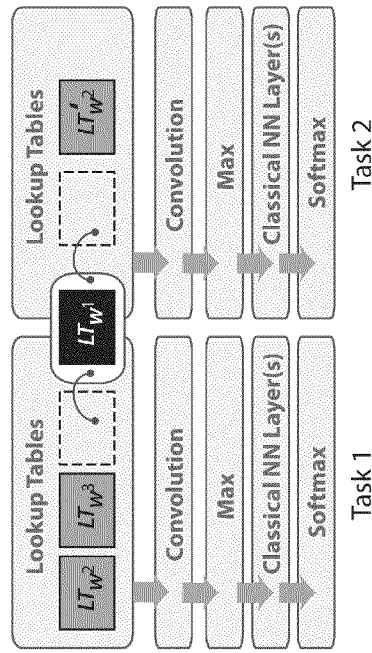
FIG. 2 is a block diagram depicting how lookup-tables are shared using the NN of FIG. 1.

A NN automatically trains features for the desired tasks in the deep layers of its architecture. In the present disclosure, the deepest layer (layers 11 and 13 with the lookup-tables), implicitly trains relevant features for each word in the dictionary. It is, therefore, reasonable to expect that when training NN s on related tasks, sharing deep layers in these NN s will improve features produced by these deep layers, and thus improve generalization performance. The present method performs very well when sharing the lookup-tables of each considered task, as illustrated in FIG. 2. Task 1 and Task 2 are two tasks trained with the NN 10 of FIG. 1. One lookup table $LT_W^1$ is shared, which means that it is identical in memory. All the other layers are task dependent. This method may be applied to more tasks.

Training may be achieved in a stochastic manner by looping over the tasks, i.e., 1) selecting the next task, 2) selecting a random example for this task, 3) computing the gradients of the NN attributed to this task with respect to this example and update the parameter, and 4) repeating steps 1-3. In one exemplary embodiment, the labeled data used for training each task can come from completely different datasets.

Figure 3:
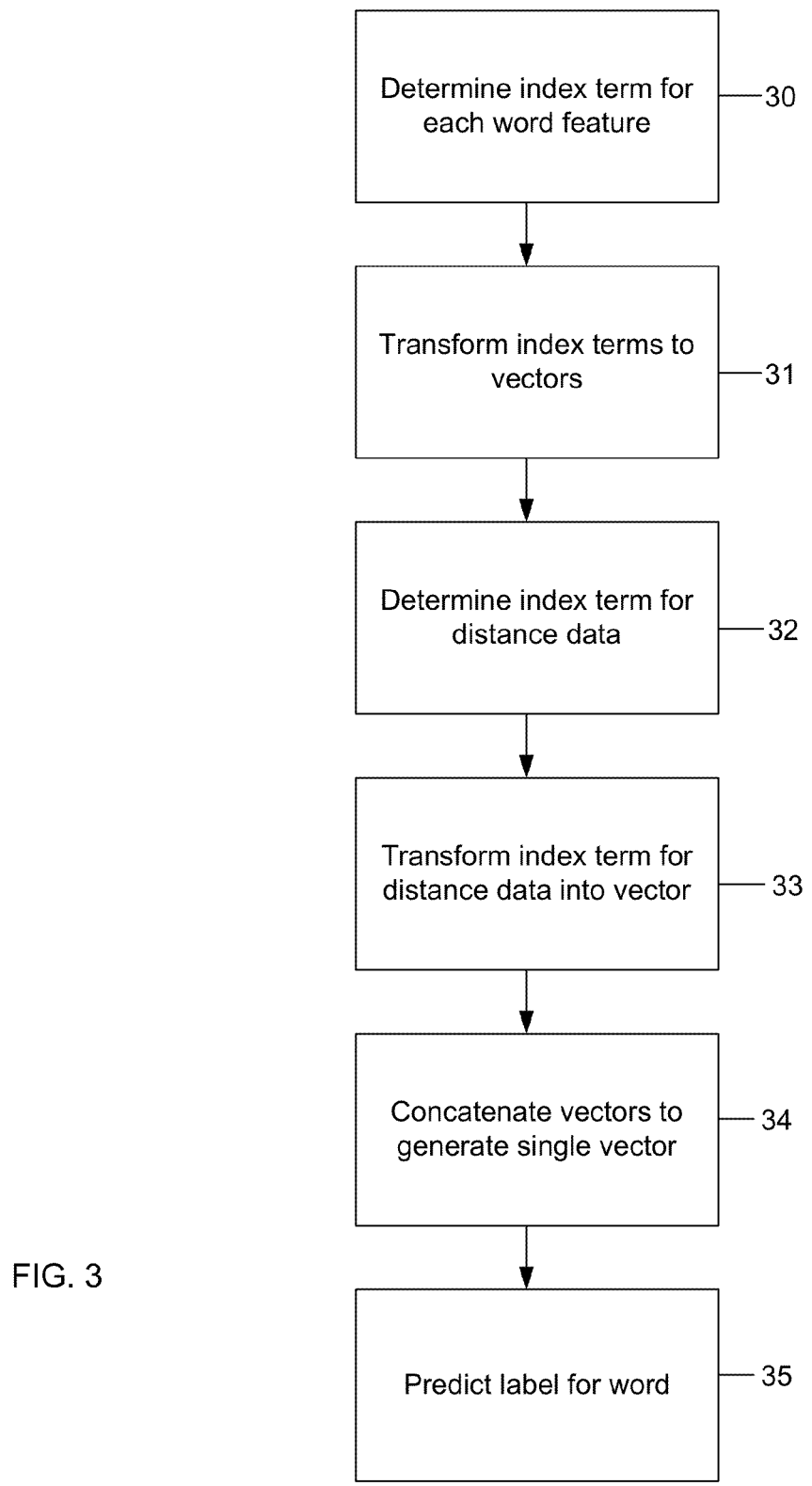
FIG. 3 is a flowchart illustrating an exemplary embodiment of a method for labeling a selected word of a sentence using the NN of FIG. 1.

FIG. 3 is a flowchart illustrating an exemplary embodiment of a method for labeling a selected word of a sentence using the deep convolutional multi-layered NN 10 of FIG. 1. An index term corresponding to each feature of the word is performed in step 30. The index term or terms of the word is/are transformed into a vector in step 31. A window of text is provided around the word of interest in step 32 and the index term corresponding to the data is transformed into another vector in step 33. In either case, the vectors (generate at step 31 or generated at steps 31 and 33) are concatenated to generate a single vector in step 34. A label for the word is predicted using the single vector in step 35. The single vector may be used directly to predict the label or it may be further processed by one or more additional layers of the NN 10 and the output of the final one of these layers may be used to predict the label in step 35.

Figure 4:
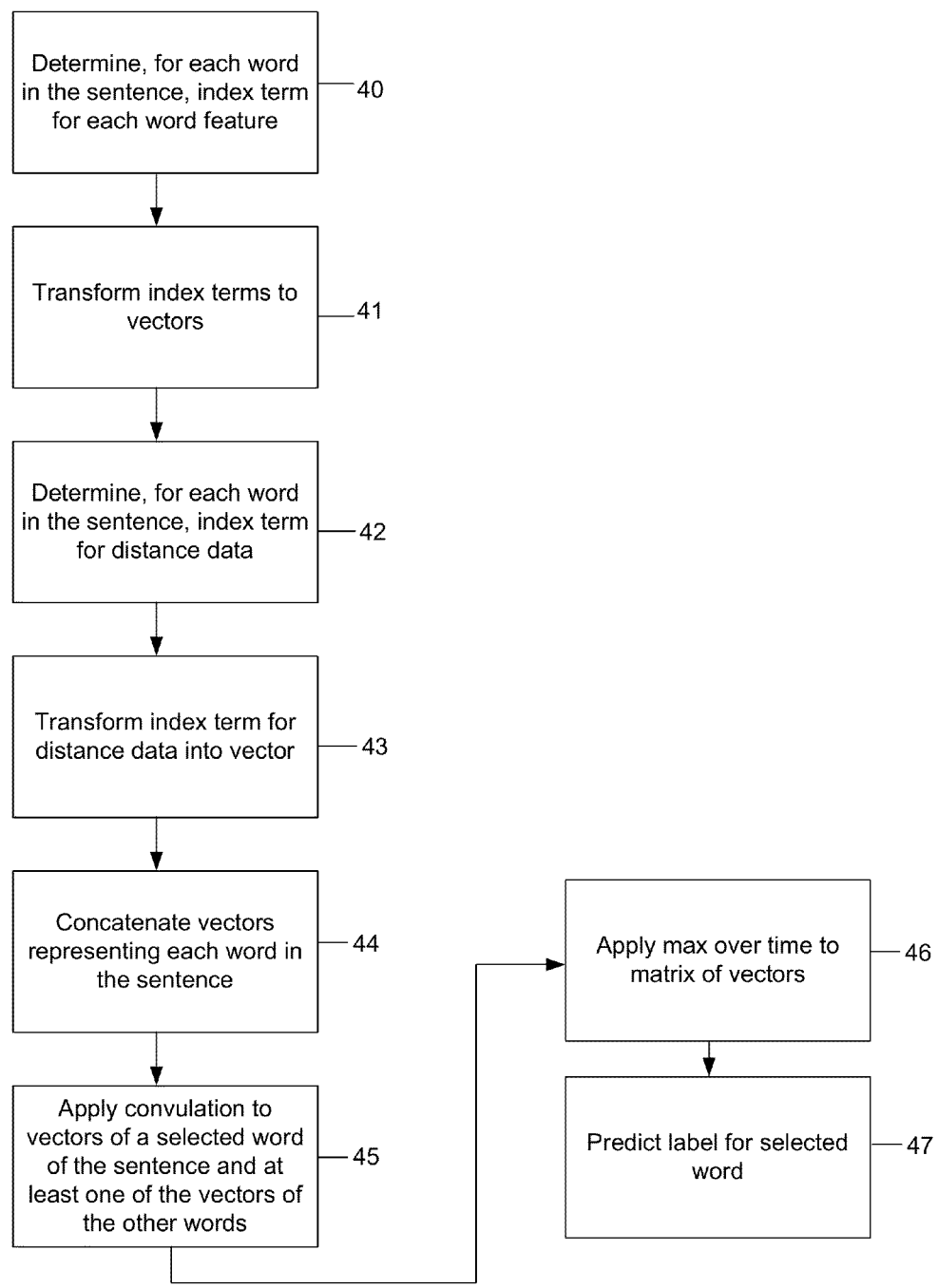
FIG. 4 is a flowchart illustrating another exemplary embodiment of a method for labeling a selected word of a sentence using the NN of FIG. 1.

FIG. 4 is a flowchart illustrating another exemplary embodiment of the method for labeling a selected word of a sentence using the deep convolutional multi-layered NN 10 of FIG. 1. For each word in the sentence, determining in step 40 an index term corresponding to each feature of the word. The index term or terms of each word in the sentence is transformed into a vector in step 41. If the NLP task is complex, for each word in the sentence, an index term corresponding to data relating to a distance between the word and a selected predicate may be determined in step 42 and the index term corresponding to the data is transformed into another vector in step 43. In either case, the vectors (generate at step 41 or generated at steps 41 and 43) are concatenated to generate a single vector in step 44 for each of the words in the sentence. A convolution operation is applied to the vector of a selected one of the words in the sentence and at least one of the vectors of the other words in the sentence in step 45, to transform the vectors into a matrix of vectors, where each of the vectors in the matrix include a plurality of row values. In step 46, a single vector is constructed from the matrix of vectors using a maximizing over time operation, an averaging over time operation, or any other suitable operation. A label is predicted for the selected word in step 47 using the single vector. The single vector may be used directly to predict the label or it may be further processed by one or more additional layers of the NN 10 and the output of the final one of these layers may be used to predict the label in step 47.

One skilled in the art will recognize that the methods described herein, may be performed by any suitably adapted computer system. The computer system may include, without limitation, a mainframe computer system, a workstation, a personal computer system, a personal digital assistant (PDA), or other device or apparatus having at least one processor that executes instructions from a memory medium.

The computer system may include one or more memory mediums on which one or more computer programs or software components may be stored. The one or more software programs which are executable to perform the methods described herein, may be stored in the memory medium. The one or more memory mediums may include, without limitation, CD-ROMs, floppy disks, tape devices, random access memories such as but not limited to DRAM, SRAM, EDO RAM, and Rambus RAM, non-volatile memories such as, but not limited hard drives and optical storage devices, and combinations thereof. In addition, the memory medium may be entirely or partially located in one or more associated computers or computer systems which connect to the computer system over a network, such as the Internet.

The methods described herein may also be executed in hardware, a combination of software and hardware, or in other suitable executable implementations. The methods implemented in software may be executed by the processor of the computer system or the processor or processors of the one or more associated computers or computer systems connected to the computer system.

Figure 5:
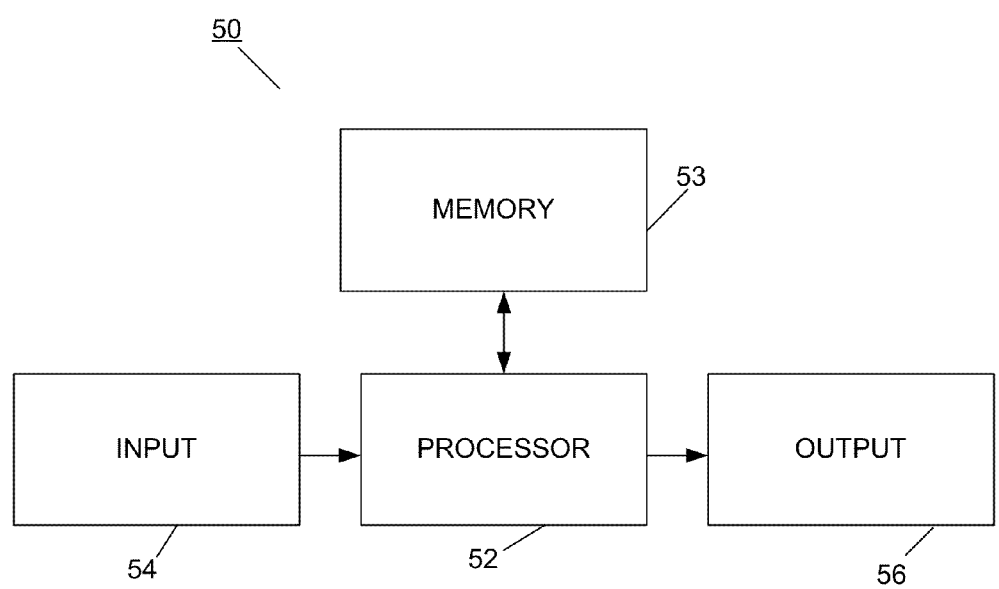
FIG. 5 is a block diagram of an exemplary embodiment of a computer system which may be used for performing the methods described herein.

FIG. 5 is a block diagram of an exemplary embodiment of a computer system 50 which may be used for performing the methods described herein. The computer system 51 includes a processor 52, a memory 53 for storing one or more programs which are executable by the processor 52 for performing the methods described herein, an input 54 for receiving input data (e.g., the unlabeled and labeled training data), and an output 56 for outputting data (e.g., the predicted class labels).

While exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention as set forth in the claims that follow and their structural and functional equivalents.

What is claimed is:

1. A method for labeling a selected word of a sentence, the method comprising the steps of:
  providing a deep neural network including a first deep layer for extracting and indexing word features of the sentence and extracting and indexing selected predicate-to-selected word distance features that are relevant to a given natural language processing (NLP) task, and a second deep layer for converting feature indices to vectors using one or more look-up tables, the deep neural network being trained using a multiple NLP task learning process, the multiple NLP task learning process sharing look-up tables during training;
  determining, with the first layer of the deep neural network in a computer process, an index term for each extracted word feature of the selected word;
  transforming, with the second layer of the deep neural network in a computer process, each of the index terms of the selected word into a vector;

determining, with the first layer of the deep neural network in a computer process, an index term for distance data between a selected predicate and the selected word;

transforming, with the second layer of the deep neural network in a computer process, the index term for the distance data into another vector;

concatenating, in a computer process, the vectors to generate a single vector; and predicting, with another layer of the deep neural network in a computer process, a label for the word using the single vector.

2. The method of claim 1, wherein the labeling comprises at least two different natural language processing tasks and further comprising the step of performing the determining, transforming and predicting steps for each task simultaneously.

3. A method for labeling a selected word of a sentence, the method comprising the steps of:

providing a deep convolutional neural network including a first deep layer for extracting and indexing word features of the sentence and extracting and indexing selected predicate-to-selected word distance features that are relevant to a given natural language processing (NLP) task, and a second deep layer for converting feature indices to vectors using one or more look-up tables, the deep convolutional neural network being trained using a multiple NLP task learning process, the multiple NLP task learning process sharing look-up tables during training;

determining with the first layer of the deep convolutional neural network in a computer process, for each word in the sentence, an index term for each extracted word feature of the word;

transforming with the second layer of the deep convolutional neural network in a computer process, each of the index terms of each of the words into a vector;

determining, with the first layer of the deep convolutional neural network in a computer process, for each word in the sentence, an index term for distance data between a selected predicate and the word;

transforming, with the second layer of the deep convolutional neural network in a computer process, each of the index terms for the distance data into another vector;

concatenating, in a computer process, the vectors of each of the words to generate a single vector for each of the words;

applying, with another layer of the deep convolutional neural network in a computer process, a convolution operation to the vector of the selected word in the sentence and at least one of the vectors of the other words in the sentence to transform the vectors into a matrix of vectors, each of the vectors in the matrix including a plurality of row values;

constructing, with another layer of the deep convolutional neural network in a computer process, a single vector from the vectors in the matrix; and predicting, with another layer of the deep convolutional neural network in a computer process, a label for the selected word using the single vector.

4. The method of claim 3, wherein the labeling comprises at least two different natural language processing tasks and further comprising the step of performing the determining, transforming, applying, constructing and predicting steps for each task simultaneously.

5. A system comprising:

a central processing unit; and a memory communicating with the central processing unit, the memory comprising instructions executable by the processor for labeling a selected word of a sentence by:

providing a deep neural network including a first deep layer for extracting and indexing word features of the sentence and extracting and indexing selected predicate-to-selected word distance features that are relevant to a given natural language processing (NLP) task, and a second deep layer for converting feature indices to vectors using one or more look-up tables, the deep neural network being trained using a multiple NLP task learning process, the multiple NLP task learning process sharing look-up tables during training;

determining, with the first layer of the deep neural network in a computer process, an index term for each extracted word feature of the selected word;

transforming, with the second layer of the deep neural network in a computer process, each of the index terms of the selected word into a vector;

determining, with the first layer of the deep neural network in a computer process, an index term for distance data between a selected predicate and the selected word;

transforming, with the second layer of the deep neural network in a computer process, the index term for the distance data into another vector;

concatenating, in a computer process, the vectors to generate a single vector; and predicting, with another layer of the deep neural network in a computer process, a label for the word using the single vector.

6. The system of claim 5, wherein the labeling comprises at least two different natural language processing tasks and further comprising performing the determining, transforming and predicting steps for each task simultaneously.

7. A system comprising:

a central processing unit; and a memory communicating with the central processing unit, the memory comprising instructions executable by the processor for labeling a selected word of a sentence by:

providing a deep convolutional neural network including a first deep layer for extracting and indexing word features of the sentence and extracting and indexing selected predicate-to-selected word distance features that are relevant to a given natural language processing (NLP) task, and a second deep layer for converting feature indices to vectors using one or more look-up tables, the deep convolutional neural network being trained using a multiple NLP task learning process, the multiple NLP task learning process sharing look-up tables during training;

determining with the first layer of the deep convolutional neural network in a computer process, for each word in the sentence, an index term for each extracted word feature of the word;

transforming with the second layer of the deep convolutional neural network in a computer process, each of the index terms of each of the words into a vector;

determining, with the first layer of the deep convolutional neural network in a computer process, for each word in the sentence, an index term for distance data between a selected predicate and the word;

transforming, with the second layer of the deep convolutional neural network in a computer process, each of the index terms for the distance data into another vector;

concatenating, in a computer process, the vectors of each of the words to generate a single vector for each of the words;

applying, with another layer of the deep convolutional neural network in a computer process, a convolution operation to the vector of the selected word in the sentence and at least one of the vectors of the other words in the sentence to transform the vectors into a matrix of vectors, each of the vectors in the matrix including a plurality of row values;

constructing, with another layer of the deep convolutional neural network in a computer process, a single vector from the vectors in the matrix; and predicting, with another layer of the deep convolutional neural network in a computer process, a label for the selected word using the single vector.

8. The system of claim 7, wherein the labeling comprises at least two different natural language processing tasks and further comprising performing the determining, transforming, applying, constructing and predicting steps for each task simultaneously.

* * * * *